(12) United States Patent
Matsubara

(10) Patent No.: US 12,137,196 B2
(45) Date of Patent: Nov. 5, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Mizuki Matsubara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 471 days.

(21) Appl. No.: 17/412,303

(22) Filed: Aug. 26, 2021

(65) Prior Publication Data

US 2022/0103721 A1 Mar. 31, 2022

(30) Foreign Application Priority Data

Sep. 28, 2020 (JP) .................................. 2020-162344
Apr. 19, 2021 (JP) .................................. 2021-070471

(51) Int. Cl.
*H04N 1/60* (2006.01)
*G06T 7/90* (2017.01)
*G06V 10/56* (2022.01)
*G06V 10/60* (2022.01)

(52) U.S. Cl.
CPC ............. *H04N 1/6086* (2013.01); *G06T 7/90* (2017.01); *G06V 10/56* (2022.01); *G06V 10/60* (2022.01); *H04N 1/6033* (2013.01)

(58) Field of Classification Search
CPC ...... H04N 1/6086; H04N 1/6033; G06T 7/90; G06T 2200/24; G06T 2207/10024; G06T 2207/20021; G06T 7/001; G06T 7/73; G06V 10/56; G06V 10/60
See application file for complete search history.

(56) References Cited

U.S. PATENT DOCUMENTS

2012/0320393 A1* 12/2012 Ito ............................ H04N 1/54
358/1.9
2019/0028614 A1* 1/2019 De Paepe ............... G01J 3/522

FOREIGN PATENT DOCUMENTS

WO 2005/074302 A1 8/2005

* cited by examiner

*Primary Examiner* — Christopher Wait
(74) *Attorney, Agent, or Firm* — Carter, DeLuca & Farrell LLP

(57) ABSTRACT

An object of the present disclosure is to provide a technique for creating color conversion parameters for performing highly accurate conversion. One embodiment of the present invention is an information processing apparatus including: an acquisition unit configured to acquire information relating to a geometrical condition in a case where a color chart irradiated with light is captured; and a determination unit configured to determine a position at which each of a plurality of color patches is laid out in the color chart based on the geometrical condition.

19 Claims, 17 Drawing Sheets

COLOR PATCH TABLE

| COLOR PATCH ID | RGB VALUES | VICINITY OF SPECULAR REFLECTION | CMYK VALUES |
|---|---|---|---|
| ID1 | (R1, G1, B1) | -3.0~+3.0 | (C1, M1, Y1, K1) |
| ID2 | (R2, G2, B2) | -2.0~+2.0 | (C2, M2, Y2, K2) |
| ID3 | (R3, G3, B3) | -1.5~+1.5 | (C3, M3, Y3, K3) |
| ... | ... | ... | ... |
| ID12 | (R12, G12, B12) | -2.2~+2.2 | (C12, M12, Y12, K12) |

FIG.7

COLOR PATCH TABLE

| COLOR PATCH ID | RGB VALUES | VICINITY OF SPECULAR REFLECTION | CMYK VALUES | NUMBER OF LAYOUTS |
|---|---|---|---|---|
| ID1 | (R1, G1, B1) | -3.0 ~ +3.0 | (C1, M1, Y1, K1) | 2 |
| ID2 | (R2, G2, B2) | -2.0 ~ +2.0 | (C2, M2, Y2, K2) | 1 |
| ID3 | (R3, G3, B3) | -1.5 ~ +1.5 | (C3, M3, Y3, K3) | 1 |
| ... | ... | ... | ... | ... |
| ID10 | (R10, G10, B10) | -2.2 ~ +2.2 | (C12, M12, Y12, K12) | 2 |

FIG.12

INFORMATION PROCESSING APPARATUS, INFORMATION PROCESSING METHOD, AND STORAGE MEDIUM

BACKGROUND OF THE INVENTION

Field of the Invention

The present disclosure relates to a color conversion technique.

Description of the Related Art

In an industrial product manufacturing factory, a color inspection is performed for checking that the manufactured products are pained in the same color. As one of color inspection methods, there is a method that uses the data of the image of the product, which is captured by an image capturing apparatus. For example, by calculating a difference in color between the captured image of a product, which is used as a reference, and the captured image of an inspection-target product, whether or not the color is different is determined.

At this time, there is a case where a difference arises in color or brightness of the image data depending on a difference in the image capturing environment, a difference in the characteristic between image capturing apparatuses, and the like. It is difficult to perform the color inspection in the state where the difference such as this has occurred, and therefore, it is necessary to convert the image data into image data in a color space, for example, such as the L*a*b* space, which is independent of the difference.

As one of conversion methods into image data in the L*a*b* space, there is one as follows. First, by an image capturing apparatus, a color chart is captured and RGB values of the color chart are acquired and further, by measuring the color chart with a dedicated measuring device and XYZ values of the color chart are acquired. Then, by performing processing for the RGB values and the XYZ values, which are acquired, by using a dedicated program, color conversion parameters indicating a correspondence relationship between the RGB space and the XYZ space are created. By using the color conversion parameters, the image data in the RGB space is converted into image data in the XYZ space. After that, the image data is converted into image data in the L*a*b* space.

At the time of creation of the color conversion parameters, in a case where a color patch whose color is near to the color of the color inspection-target product is included in the color chart, the color conversion accuracy will be higher. Because of this, even in a case where a material having angle dependence is included in the color inspection-target product, it is desirable for a color patch whose color is near to the color of the material to be included in the color chart.

However, in a case where a color patch having angle dependence is included in the color chart, the influence of specular reflection becomes great. International Laid Open No. 2005/074302 has disclosed a color chart in which a plurality of color patches having angle dependence of the same color is laid out as a technique for lessening the influence of specular reflection. The possibility becomes strong that a color patch having angle dependence in which specular reflection has not occurred exists in the color chart such as this, and therefore, it is possible to lessen the influence of specular reflection by, for example, averaging the RGB values of a plurality of color patches having angle dependence.

SUMMARY OF THE INVENTION

However, in the color chart disclosed in International Laid Open No. 2005/074302, at the time of laying out a color patch having angle dependence within the color chart, there is a case where illumination light enters the captured image depending on the position and in the case such as that, it is not possible to create highly accurate color conversion parameters.

Consequently, in view of the above-described problem, an object of one embodiment of the present invention is to provide a technique for creating color conversion parameters for performing highly accurate conversion in a case where a color patch having angle dependence is used.

One embodiment of the present invention is an information processing apparatus including: an acquisition unit configured to acquire information relating to a geometrical condition in a case where a color chart irradiated with light is captured; and a determination unit configured to determine a position at which each of a plurality of color patches is laid out in the color chart based on the geometrical condition.

Further features of the present invention will become apparent from the following description of exemplary embodiments with reference to the attached drawings.

BRIEF DESCRIPTION OF THE DRAWINGS

FIG. 7 is a diagram showing a color patch table;

FIG. 12 is a diagram showing a color patch table:

DESCRIPTION OF THE EMBODIMENTS

In the following, embodiments of the present invention are explained with reference to the drawings. The following embodiments are not necessarily intended to limit the present invention. Further, all combinations of features explained in the present embodiments are not necessarily indispensable to the solution of the present invention.

First Embodiment

<Configuration of Color Conversion Parameter Creation System>

Figure 1:
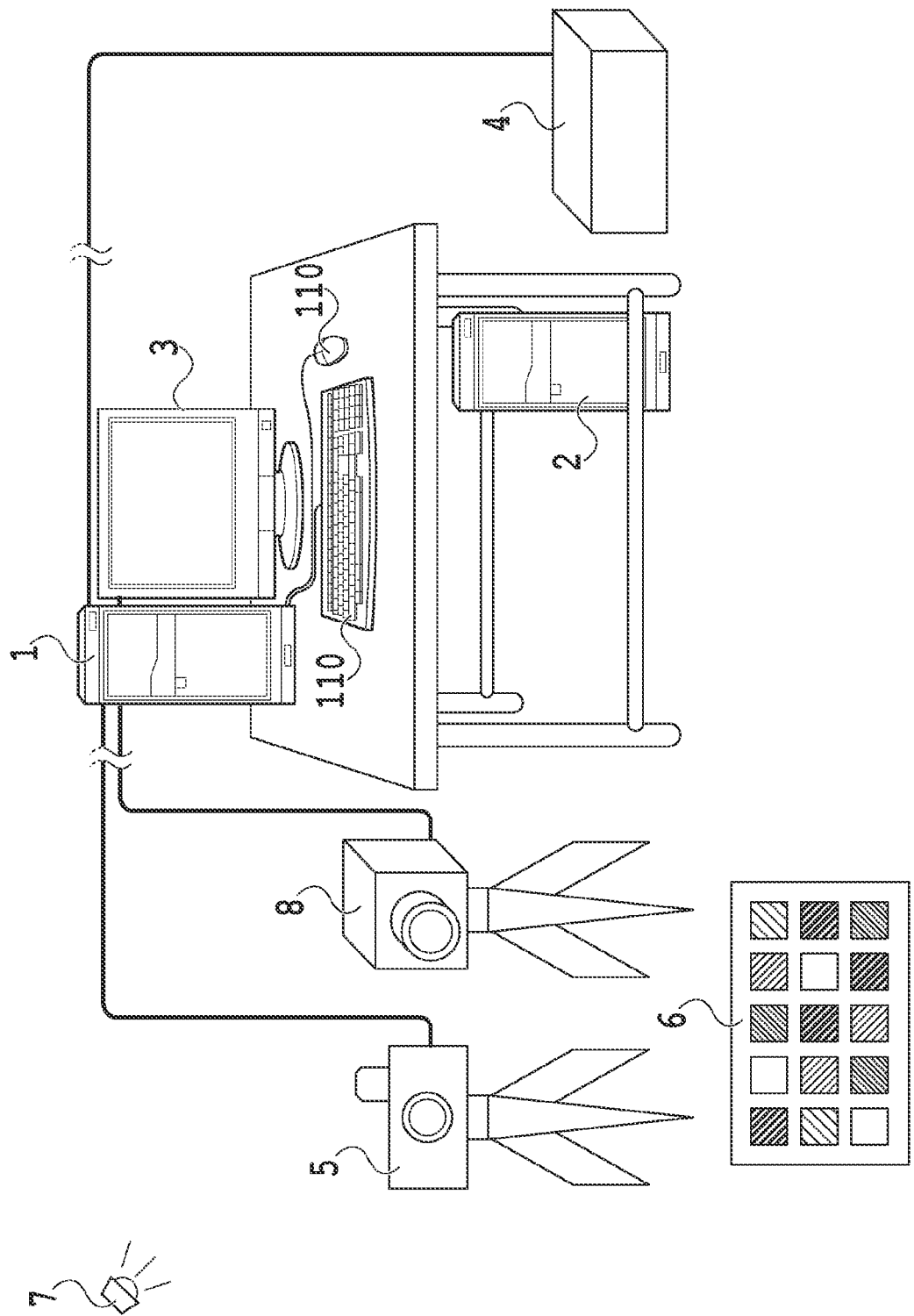
FIG. 1 is a diagram showing a configuration of a color conversion parameter creation system.

FIG. 1 is a diagram showing a configuration of a color conversion parameter creation system. The color conversion parameter creation system has an information processing apparatus 1, an information processing apparatus 2, a display device 3, a printing apparatus 4, an image capturing apparatus 5, a color chart 6, an illumination 7, a measuring device 8, and an input device 110. In this color conversion parameter creation system, the input of a user is received via the input device 110 and contents based on the input are displayed on the display device 3.

Further, in the color conversion parameter creation system, the color chart 6 is created by causing the printing apparatus 4 to perform printing processing base on data of the color chart created by the information processing apparatus 1. In the state where the color chart 6 is irradiated by the illumination 7, image capturing is performed by the image capturing apparatus 5. It is desirable for the geometrical condition at this time and the characteristics of the image capturing apparatus 5 and the illumination 7 to be near to those used for the color inspection. In the geometrical condition at the time of image capturing by the image capturing apparatus 5, the relative positional relationship between the image capturing apparatus 5, the color chart 6, and the illumination 7, the orientation of each of the image capturing apparatus 5, the color chart 6, and the illumination 7, and the like are included.

Further, in the color conversion parameter creation system, the color chart 6 is measured with the measuring device 8. FIG. 1 shows an aspect in which the image capturing apparatus 5 and the measuring device 8 are arranged side by side, but it is desirable for the geometrical condition at the time of image capturing and the image capturing condition at the time of measurement to be equal. Because of this, in a case where the measuring device 8 is used, it is desirable to exchange the position of the measuring device 8 with the position of the image capturing apparatus 5.

<Hardware Configuration of Information Processing Apparatus>

Figure 2:
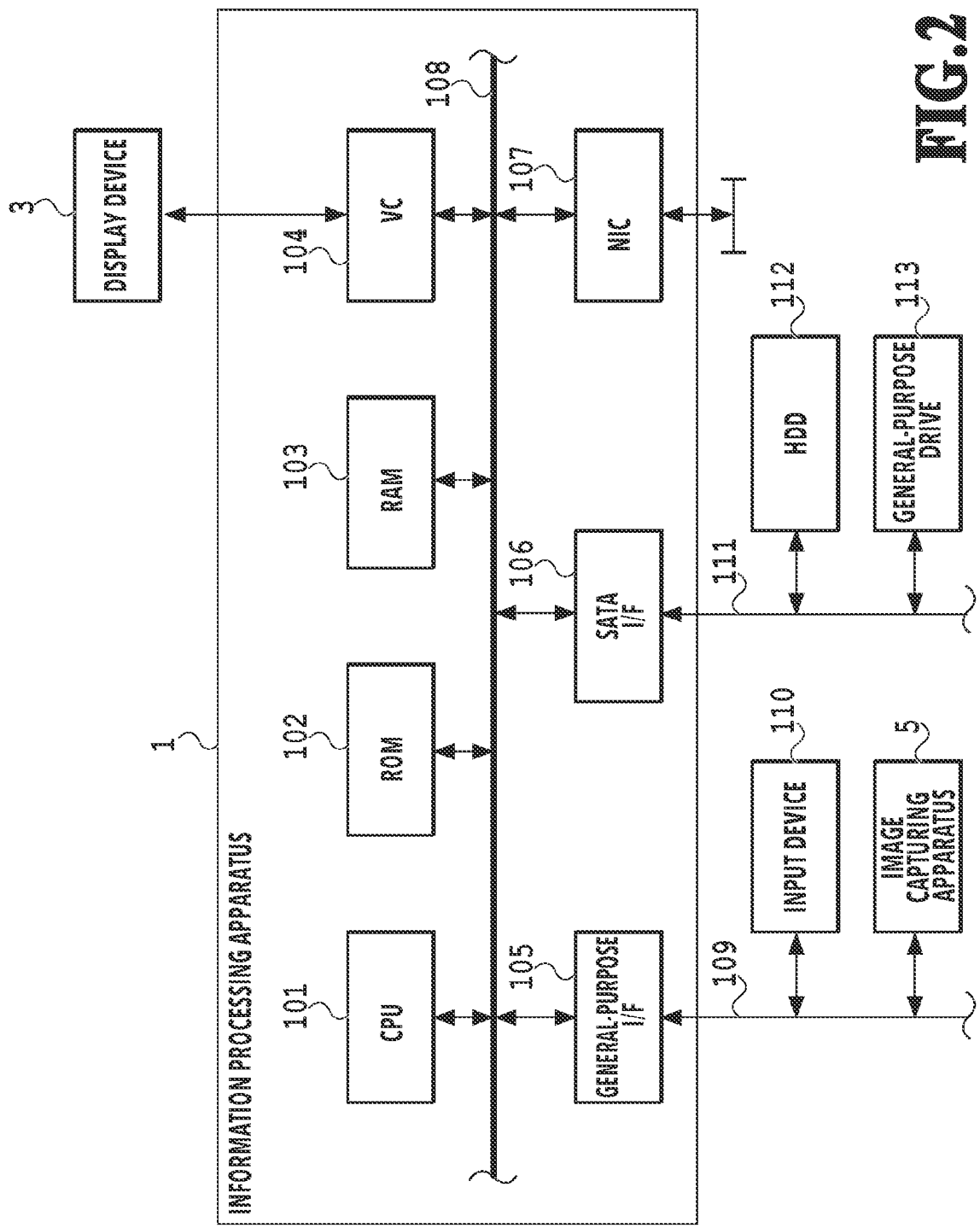
FIG. 2 is a block diagram showing a hardware configuration of an information processing apparatus.

FIG. 2 is a block diagram showing the hardware configuration of the information processing apparatus 1. The information processing apparatus 1 has a CPU 101, a ROM 102, and a RAM 103. Further, the information processing apparatus 1 has a VC (Video Card) 104, a general-purpose I/F (interface) 105, a SATA (serial ATA) I/F 106, and an NIC (Network Interface Card) 107.

The CPU 101 executes the OS (Operating System) and various programs stored in the ROM 102, an HDD (Hard Disk Drive) 112 and the like by using the RAM 103 as a work memory. Further, the CPU 101 controls each component via a system bus 108. The processing in the flowchart, to be described later, is performed by program codes stored in the ROM 102, the HDD 112 and the like being developed onto the RAM 103 and by the CPU 101 executing the developed program codes.

To the VC 104, the display device 3 is connected. To the general purpose I/F 105, the input device 110, such as a mouse and a keyboard, and the image capturing apparatus 5 are connected via a serial bus 109. To the SATA I/F 106, the HDD 112 and a general-purpose drive 113 that performs reading and writing from and to various storage media are connected via a serial bus 111. The NIC 107 performs input and output of information with an external device. The CPU 101 uses the HDD 112 and the various storage media mounted on the general-purpose drive 113 as a storage location of various kinds of data. The CPU 101 displays a GUI (Graphical User Interface) provided by a program on the display device 3 and receives an input, such as user instructions, which can be received via the input device 110.

The information processing apparatus 2 also has the same configuration as that of the information processing apparatus 1. The information processing apparatus 1 and the information processing apparatus 2 do not necessarily have to be different hardware and they may share the same hardware.

<Function Configuration of Information Processing Apparatus>

Figure 3:
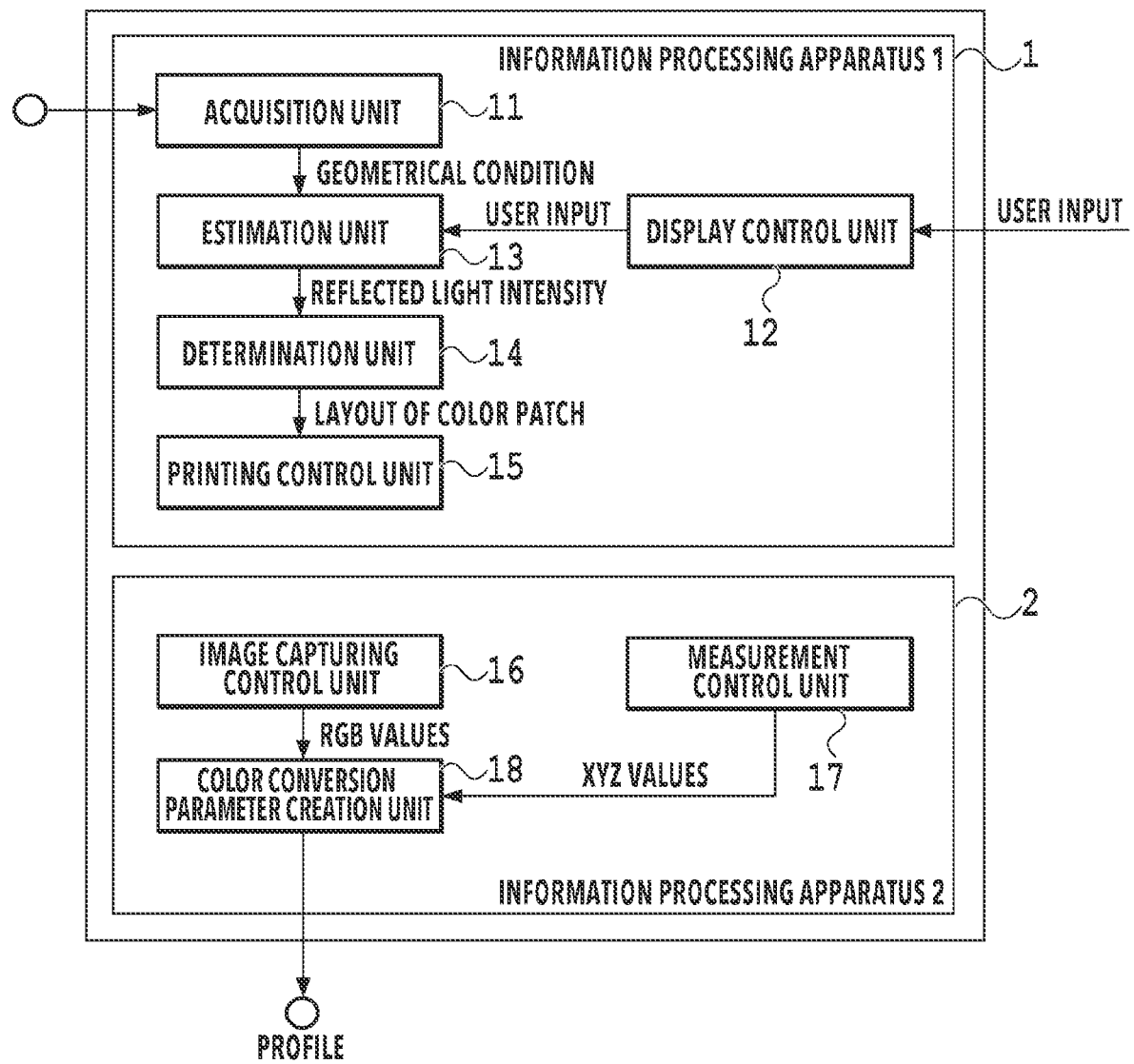
FIG. 3 is a block diagram showing a function configuration of the information processing apparatus.

FIG. 3 is a block diagram showing the function configuration of the information processing apparatus 1. The CPU 101 implements each function module shown in FIG. 3 by reading and executing programs stored in the ROM 102 or the HDD 112 using the RAM 103 as a work memory. All the processing shown in the following does not need to be performed by the CPU 101 and the information processing apparatus 1 may be configured so that part or all of the processing is performed by one or a plurality of processing circuits other than the CPU 101.

As shown in FIG. 3, the information processing apparatus 1 has an acquisition unit 11, a display control unit 12, an estimation unit 13, a determination unit 14, and a printing control unit 15. Further, the information processing apparatus 2 has an image capturing control unit 16, a measurement control unit 17, and a color conversion parameter creation unit 18.

Figure 4:
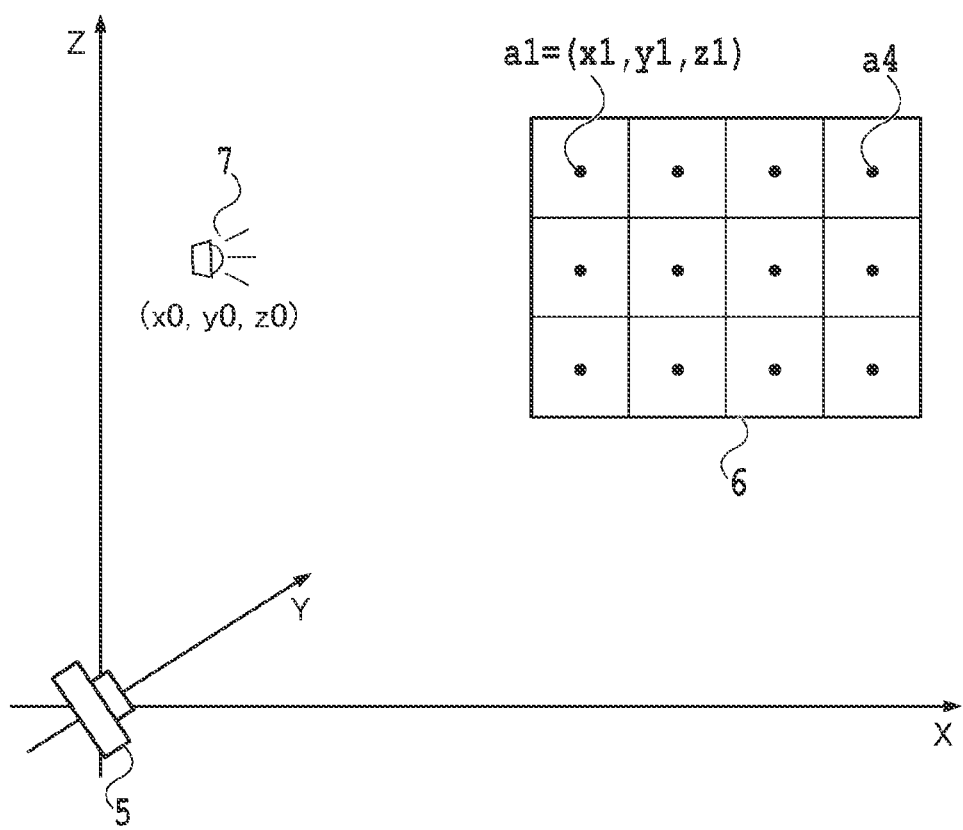
FIG. 4 is a diagram showing a geometrical condition at the time of capturing a color chart.
Figure 5:
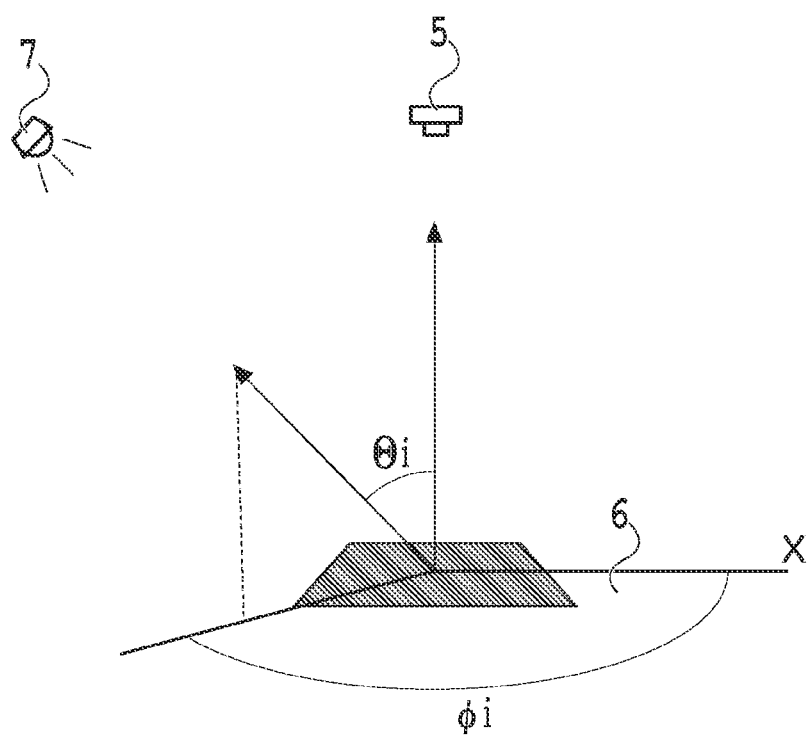
FIG. 5 is a diagram showing a geometrical condition at the time of capturing a color chart.

The acquisition unit 11 is an acquisition unit for acquiring information relating to a geometrical condition at the time of capturing a color chart. In the present embodiment, in order to acquire the reflected light characteristic on the surface of the color chart 6, the acquisition unit 11 is used. FIG. 4 and FIG. 5 each show an example of the geometrical condition at the time of capturing the color chart.

FIG. 4 shows a positional relationship between the light source 7 and the color chart 6 in a three-dimensional orthogonal coordinate system with the set position of the image capturing apparatus 5 being taken as the origin. The coordinates of the light source 7 are taken to be (x0, y0, z0). As shown in FIG. 4, the color chart 6 consists of 12 (=three in the vertical direction×four in the horizontal direction) color patches. Each of the 12 color patches is a square and the center point of each color patch is taken to be a1, a2, ..., a12. Further, the coordinates of the center point of each color patch (called center coordinates of color patch) are taken to be (x1, y1, z1), (x2, y2, z2), ..., (x12, y12, z12).

FIG. 5 shows the geometrical condition at the time of capturing the color chart in a spherical coordinate system. Here, it is assumed that the camera 5 and the color chart 6 squarely face each other. Further, FIG. 5 shows the geometrical condition for the center point ai of the ith color patch. As shown in FIG. 5, an angle formed by an axis x located on the same plane as that of the color chart 6 and a vector obtained by orthogonally projecting a vector from the center point ai to the light source 7 onto the same plane is taken to be φi and an angle formed by an axis whose starting point is the center point ai and which passes through the image capturing apparatus 5 and the vector from the center point ai to the light source 7 is taken to be θi.

Figure 6:
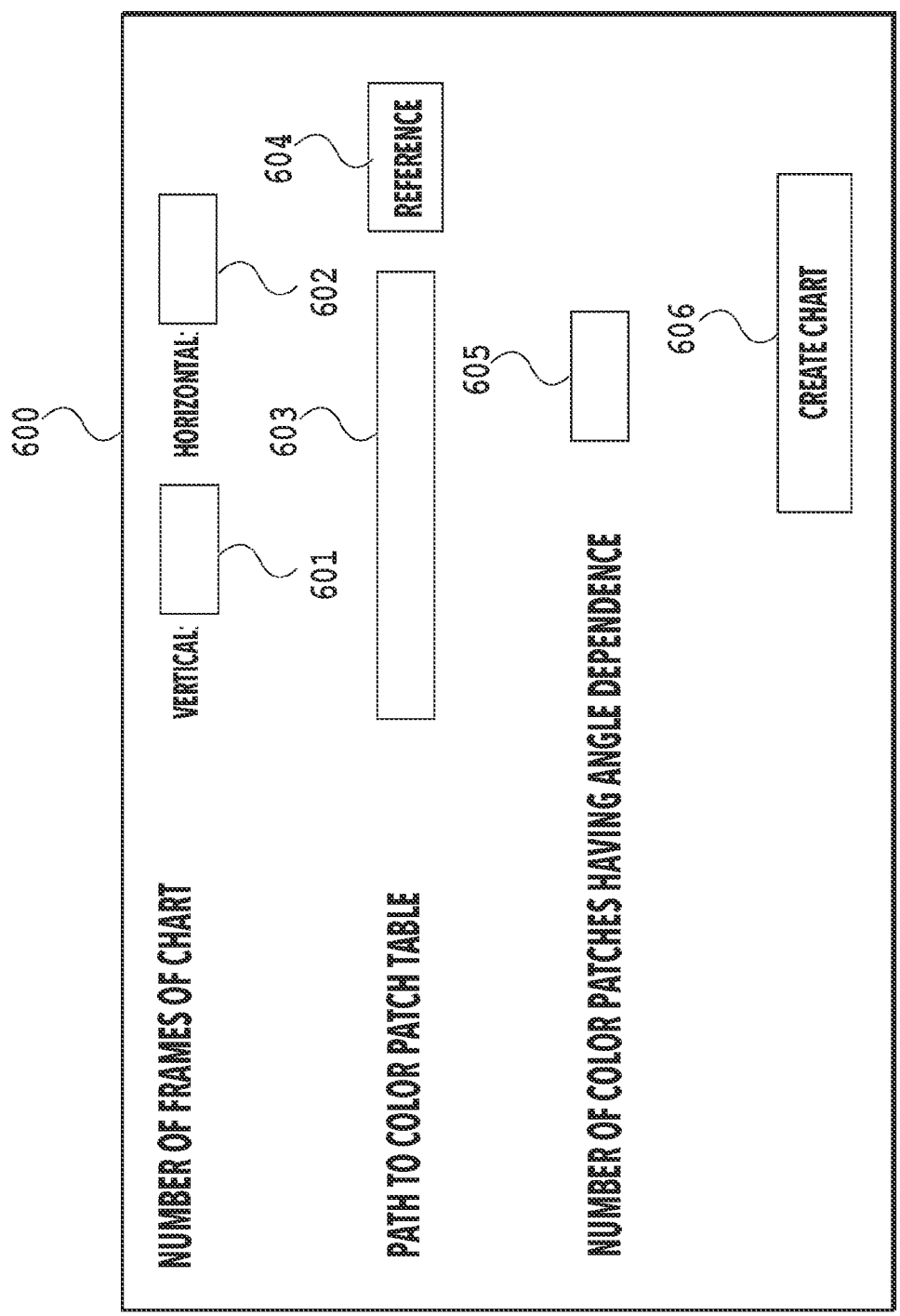
FIG. 6 is a diagram showing a GUI.

The display control unit 12 displays a GUI on, for example, the display device 3 and receives user instructions that are input via the input device 110. In the present embodiment, as an example, a GUI 600 shown in FIG. 6 is used. As shown in FIG. 6, the GUI 600 has text boxes indicated by symbols 601, 602, 603, and 605 and buttons indicated by symbols 604 and 606.

A user inputs the number of vertically laid-out frames of the color chart to the text box 601, which is a setting unit of the number of layouts of the color patch. Similarly, the user inputs the number of horizontally laid-out frames of the color chart to the text box 602, which is a setting unit of the number of layouts of the color patch. Further, the user inputs the path to a file in a color patch table in which color patch information is described to the text box 603, which is a file path input unit. In this path input, it may also be possible to refer to the path by using software, such as a file explorer. In the case such as that, the user presses down the Reference button 604 and activates a file explorer. The color patch table is, for example, a table as shown in FIG. 7 and saved in the file format, such as csv. In the table in FIG. 7, in the first column, the value of the color patch ID corresponding to the kind of color patch is stored. In the second column, RGB values in a captured image are stored. In the third column, information relating to the reflected light characteristic of the color patch is stored. Here, as the information relating to the reflected light characteristic, an angle in the vicinity of specular reflection is adopted. The reflected light of the light having entered the color patch is the sum of the diffuse reflection component having substantially the same reflection intensity in a variety of directions and the specular reflection component having a high reflection intensity in the vicinity of the specular reflection angle being taken as a center. It is possible to calculate the reflected light characteristic such as this by using a bidirectional reflectance distribution function (BRDF) and the like. For example, this specular reflection component is measured in advance for each color patch and the angle at which the intensity is higher than or equal to a threshold value is taken to be the angle in the vicinity of specular reflection and described in the color patch table. In the fourth column, a combination (referred to as CMYK values) of each value of cyan, magenta, yellow, and black, which corresponds to the ink amounts at the time of performing printing with the printing apparatus 4, is stored. In a case where a specific ink, such as a metal ink, is used in the printing apparatus 4, the value thereof is also stored. A color chart is created by the information processing apparatus 1 and the information processing apparatus 2 performing the following processing based on the user input via the GUI 600.

<Explanation of Color Patch Having Angle Dependence>

Explanation of a color patch having angle dependence in the present embodiment is described. The angle dependence is a ratio of the intensity in the specular reflection direction to the intensity in the diffuse reflection direction of a color patch. The color patch having angle dependency refers to a color patch whose angle dependence is relatively great. As the color patch having angle dependence, mention is made of, for example, a color patch in a metallic color.

<Processing Performed by Information Processing Apparatus>

Figure 8:
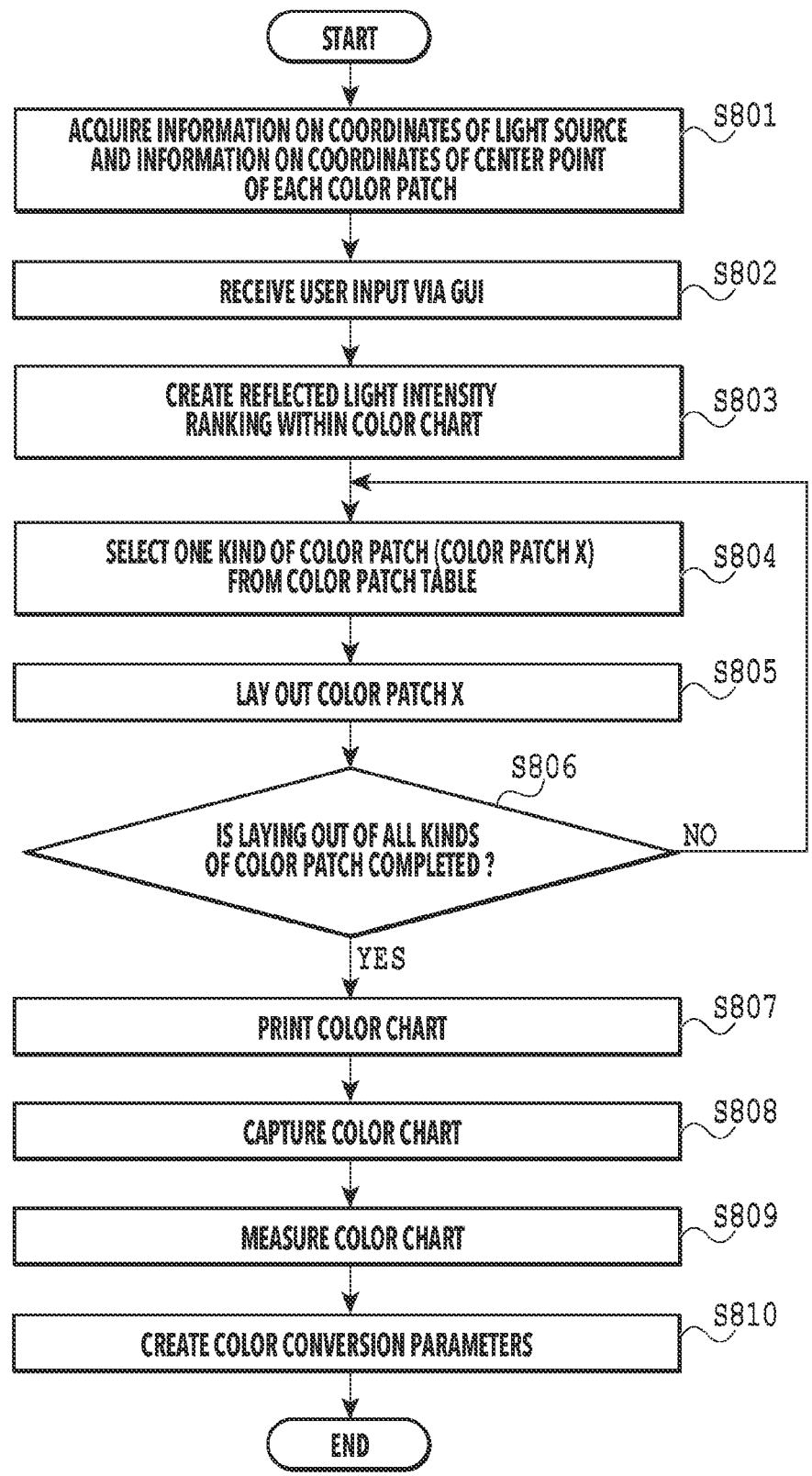
FIG. 8 is a flowchart showing processing of the information processing apparatus.

FIG. 8 is a flowchart showing the processing performed by the information processing apparatus 1 and the information processing apparatus 2. In the following, each step (process) is represented by attaching S to the top of the numerical value.

At S801, the acquisition unit 11 acquires the geometrical condition at the time of capturing the color chart. The geometrical condition that is acquired at this step includes information on the coordinates (x0, y0, z0) of the light source 7 and information on the coordinates (x1, y1, z1), (x2, y2, z2), . . . , (x12, y12, z12) of the center points a1, a2, . . . , a12 of the color patches. As the acquisition method of the information, for example, there is a method in which values measured by using a measuring device, such as a measure, are stored in advance in the ROM 102 and the like and the acquisition unit 11 acquires the stored value.

At S802, the display control unit 12 receives a user input relating to the setting of a color chart. Here, the state transition in a case where the display control unit 12 uses the GUI shown in FIG. 6 is explained with reference to FIG. 9.

Figure 9:
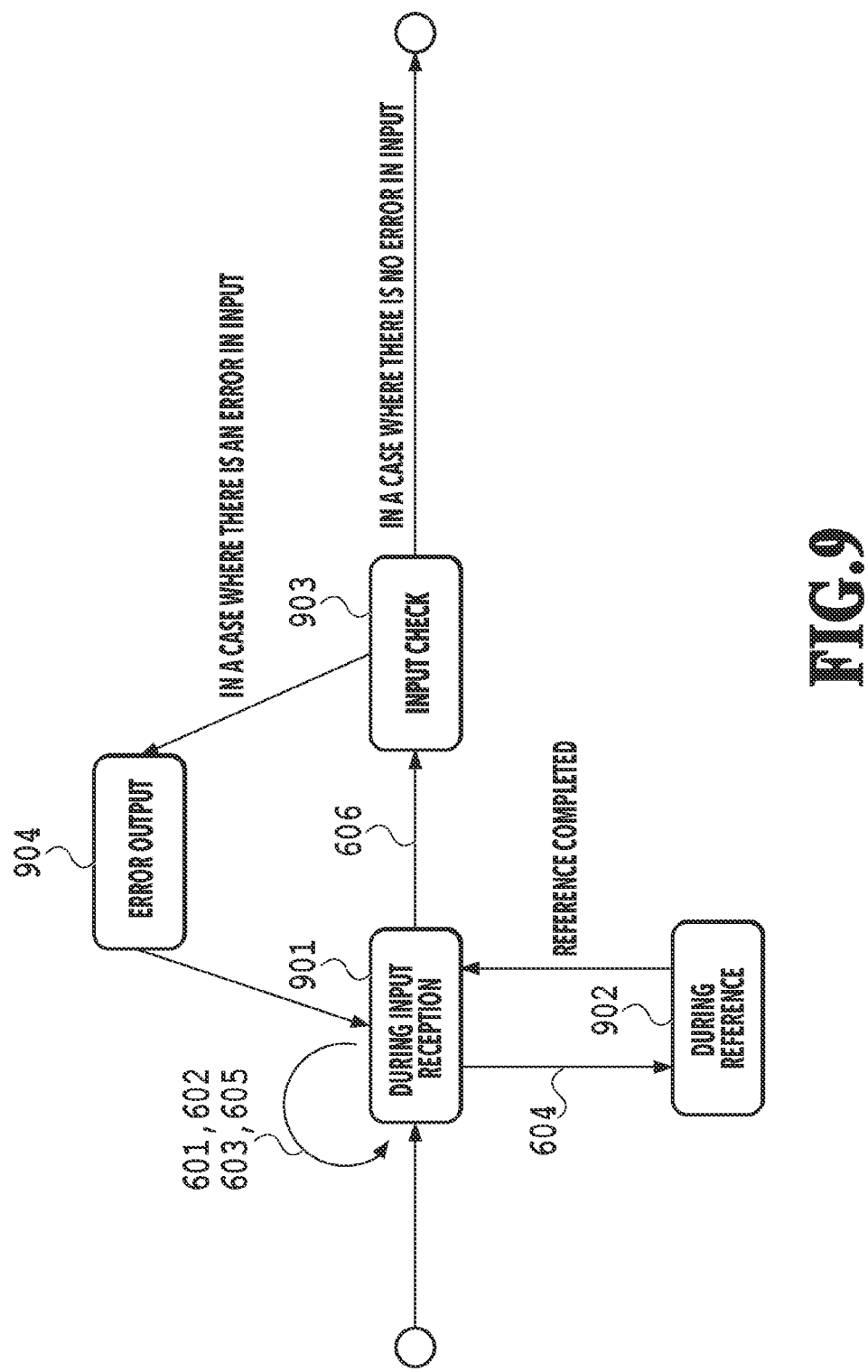
FIG. 9 is a state transition diagram in a case where the GUI in FIG. 6 is used.

In FIG. 9, each of symbols 901 to 904 indicates one state and each of the symbols 601 to 606 indicates an input by the operation element shown in FIG. 6. First, in "During input reception" 901, an input by a user is received. The user inputs the number of vertically laid-out frames of the color chart to the text box 601 and inputs the number of horizontally laid-out frames to the text box 602. For example, in a case where 12 color patches are laid out, the user inputs "3" to the text box 601 and inputs "4" to the text box 602. Further, the user inputs the path of the color patch table file stored in advance in the HDD 112 and the like to the text box 603. Furthermore, the user inputs the number of color patches having angle dependence to the text box 605. In a case where the display control unit 12 receives the inputs via these text boxes, as shown in FIG. 9, the transition is self-transition from "During input reception" 901 to "During input reception" 901. In a case of inputting the path, it may also be possible for the user to transmit to "During reference" 902 by pressing down the Reference button 604 and refer to one or a plurality of paths. Further, in a case where the user presses the Create chart button 606, the state transitions from "During input reception" 901 to "Input check" 903.

In "During reference" 902, for example, a file explorer is activated and a path is referred to. In a case where the user selects one path and completes reference, the state transitions from "During reference" 902 to "During input reception" 901 and the selected path is automatically input to the text box 603.

In "Input check" 903, whether the user input is performed correctly, specifically, whether there is a flaw in the input information is checked, whether a file exists at the designation destination of the path that is input to the text box 603 is checked, and so on. Then, in a case where the user input is not performed correctly, the state transitions from "Input check" 903 to "Error output" 904. On the other hand, in a case where the user input is performed correctly, the processing at S803 (see FIG. 8) is performed.

In "Error output" 904, error contents, for example, the contents of the item that is input by a user and which is not correct are displayed in a pop-up manner or the like. After displaying the error contents, the state returns to "During input reception" 901 and the state where the display control unit 12 receives the input by a user again is brought about. The information that is input by a user is stored in the ROM 102, the HDD 112 or the like and after this, read and used as needed.

At S803, the estimation unit 13 creates a reflected light intensity ranking indicating the ranking of each frame in which the color patch is laid out within the color chart. It is possible to express the reflected light intensity by the direct light of the light source 7 by formula (1) in a case where the coordinate information on the light source 7 acquired at S801 and the coordinate information on the center point of each frame within the chart are used and the intensity of the direct light of the light source 7 is taken to be V.

[Mathematical formula 1]

$$\text{reflected light intensity} = V \cos \theta_i \ (i=1,2,\ldots,12) \quad \text{formula (1)}$$

Here, $\cos \theta_i$ is found by formula (2).

[Mathematical formula 2]

$$\cos\theta_i = \frac{x_0 x_i + y_0 y_i + z_0 z_i}{\sqrt{x_0^2 + y_0^2 + z_0^2}\sqrt{x_i^2 + y_i^2 + z_i^2}} \quad \text{formula (2)}$$

$(i = 1, 2, \ldots, 12)$

In a case where it is assumed that the intensity of the direct light is the same at each point irrespective of the position of the point, the ranking of the reflected light intensity is the same as the ranking of the magnitude of $\cos \theta_i$ that is calculated by formula (2). It may also be possible to acquire the ranking of the reflected light intensity by performing measurement. For example, it may also be possible to create the ranking of the reflected light intensity by placing a mirror as an object that causes total reflection approximately at the position of the color chart and observing the mirror from the position of the image capturing apparatus 5 and visually checking the reflected light intensity. Further, it may also be possible to create the ranking of the reflected light intensity by actually capturing the mirror with the image capturing apparatus 5 and based on the image data acquired by the image capturing.

At S804, the determination unit 14 selects one kind of color patch from the color patch table. As will be described later, the selection processing at this step is performed repeatedly and at the time of this repetitive selection of the color patch, the color patch is selected in order from the color patch whose angle in the vicinity of specular reflection is the widest. This selected color patch is taken to be a color patch X.

At S805, the determination unit 14 lays out the color patch X. By using the reflected light intensity ranking that is found at S803, the determination unit 14 lays out the color patch X selected at immediately previous S804 in the frame whose reflected light intensity is the lowest among the frames in which the color patch is not laid out yet.

At S806, the determination unit 14 determines whether the laying out at S805 is completed for all the kinds of color patch whose information is stored in the color patch table. In a case where the determination results at this step are affirmative, the processing advances to step S807. On the other hand, in a case where the determination results at this step are negative, the processing returns to S804. In a case where the laying out of the color patches corresponding to the number of color patches having angle dependence, which is input via the text box 605, is completed, it may also be possible to advance the processing to S807 by appropriately laying out the remaining color patches. In this case, it may also be possible to randomly lay out the color patches other than the color patches having angle dependence, or lay out them by taking into consideration the nearness of color.

After S806, it may also be possible for the determination unit 14 to select an already-existing color chart near to the color chart determined by the processing at S804 to S806. For example, the color chart whose degree of nearness is the highest is selected from the already-existing Macbeth color charts or the color charts created previously. As regards the nearness that is used at the time of this selection, for example, the number of counts indicating the number of color charts created from the same color material is calculated and it is determined that the larger the number of counts, the higher the degree of nearness is. Alternatively, it may also be possible to determine that the larger the number of counts of the color charts whose angle in the vicinity of specular reflection described in the color chart table is the same, the higher the degree of nearness is. Further, alternatively, it may also be possible to determine that the nearer the number of color patches having angle dependency, the higher the degree of nearness is.

Figure 10:
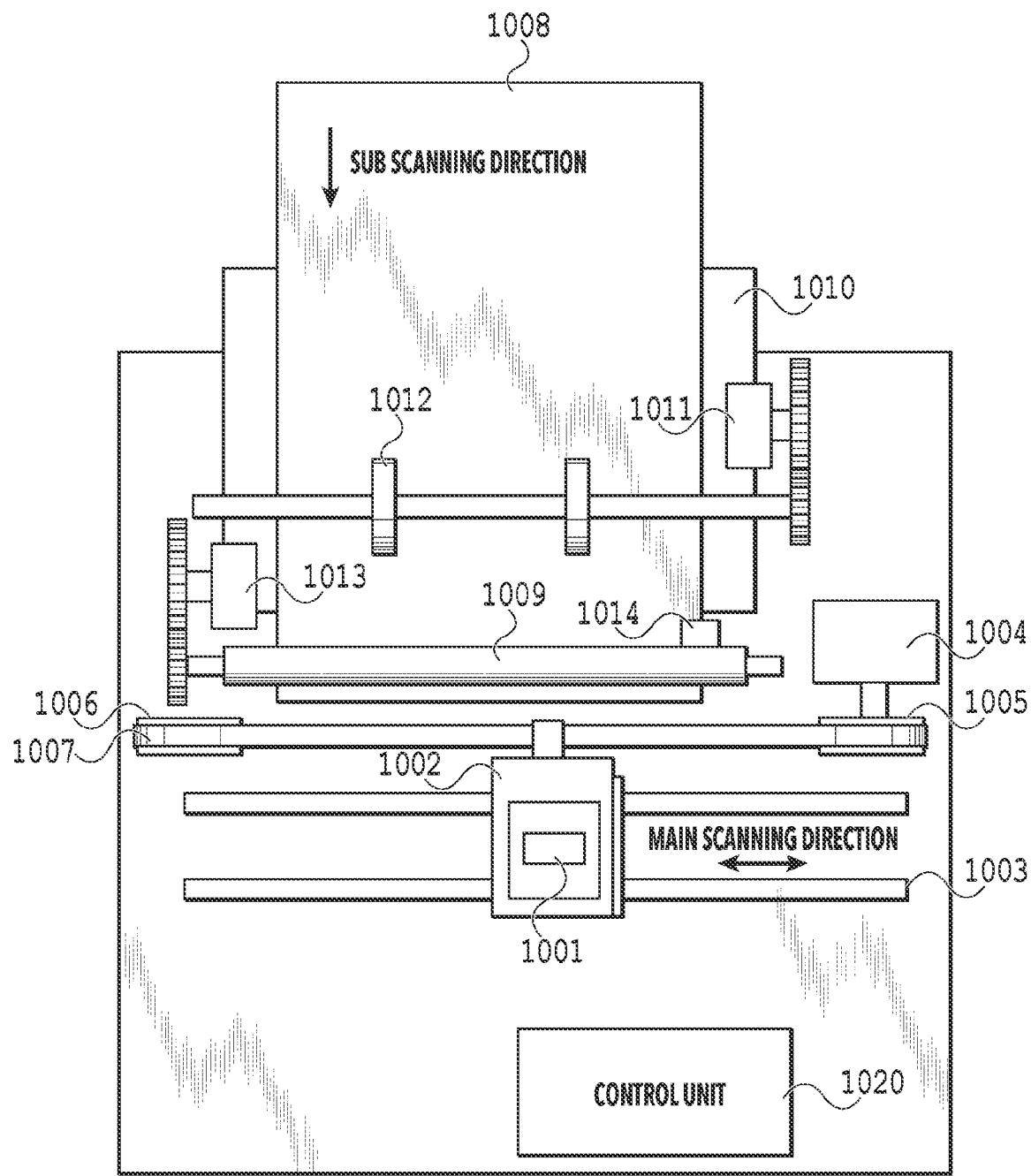
FIG. 10 is a diagram showing a configuration of a printing apparatus.

At S807, the printing control unit 15 creates a color chart by using the printing apparatus 4. In the creation of a color chart, first, data of the color chart is generated. For example, based on the layout of the color patches determined by the processing up to S806, the image data is generated in which the pixel values corresponding to each color patch are the CMYK values read from the color patch table. Then, the printing control unit 15 causes the printing apparatus 4 to perform printing based on the image data of the color chart. Here, the configuration of the printing apparatus 4 is explained by using FIG. 10.

A head cartridge 1001 has a print head including a plurality of ejection ports and an ink tank that supplies ink to the print head and the head cartridge 1001 is provided with a connector for receiving a signal that drives each ejection port of the print head, and the like. It is possible for the ink tank to mount ink of each color of CMYK and metal ink. The head cartridge 1001 is mounted exchangeably on a carriage 1002 by being positioned and the carriage 1002 is provided with a connector holder for transmitting a drive signal and the like to the head cartridge 1001 via the connector.

The carriage 1002 is capable of reciprocating along a guide shaft 1003. Specifically, the carriage 1002 is driven by using a main scanning motor 1004 as a drive source via drive mechanisms, such as a motor pulley 1005, a follower pulley 1006, and a timing belt 1007 and at the same time, the position and movement of the carriage 1002 are controlled. The movement along the guide shaft 1003 of the carriage 1002 is called "main scanning" and the movement direction of the carriage 1002 is called "main scanning direction".

A printing medium 1008 for printing is placed in an auto sheet feeder (in the following, "ASF") 1010. At the time of printing, a pickup roller 1012 rotates by the drive of a sheet feed motor 1011 via a gear and the printing medium 1008 is separated one by one from the ASF 1010 and fed. Further, the printing medium 1008 is conveyed to a printing start position facing the ejection port surface of the head cartridge 1001 on the carriage 1002 by the rotation of a conveyance roller 1009. The conveyance roller 1009 is driven via a gear by using a line feed (LF) motor 1013 as a drive source. The determination of whether or not the printing medium 1008 is fed and the settlement of the position at the time of feed are performed at the point in time at which the printing medium 1008 passes a paper end sensor 1014. The head cartridge 1001 mounted on the carriage 1002 is retained so that the ejection port surface protrudes downward from the carriage 1002 and is parallel to the printing medium 1008. A control unit 1020 controls the operation of each part of the printing apparatus 4. In order to simplify explanation, explanation is given on the assumption that the printing apparatus 4 in the present embodiment is a binary printer that performs control of whether or not to eject ink at a predetermined resolution. Further, it may also be possible for the printing apparatus 4 to adopt a method of capable of changing the size of an ink droplet to be ejected.

In the following, the image formation operation is explained. First, in a case where the printing medium 1008 is conveyed to a predetermined printing start position, the carriage 1002 moves on the printing medium 1008 along the guide shaft 1003 and during the movement, ink is ejected from the ejection port of the print head. In a case where the carriage 1002 moves up to one end of the guide shaft 1003, the conveyance roller 1009 conveys the printing medium 1008 by a predetermined amount in the direction perpendicular to the scanning direction of the carriage 1002. This conveyance of the printing sheet 1008 is called "sheet feed" or "sub scanning" and the conveyance direction of the printing medium 1008 is called "sheet feed direction" or "sub scanning direction". In a case where the conveyance of the printing medium 1008 by a predetermined amount is completed, the carriage 1002 moves again along the guide shaft 1003. By repeating the scanning and sheet feed by the carriage 1002 of the print head as described above, an image is formed on the printing medium 1008. In a case where the metal ink is used, on a condition that the metal ink application region and the color ink application region do not overlap, whichever ink may be applied first. Further, in a case where the metal ink is applied onto 100% of the substrate, it is desirable to apply the color ink after applying the white ink onto the color ink application region.

The printing medium that is used in the present embodiment may be any printing medium as long as it is compatible with printing by the print head. Further, in the present embodiment, the printing method of the printing apparatus 4 is assumed to be the ink jet method, but it may also be possible to adopt another printing method as the printing method of the printing apparatus 4.

It is not necessarily required to create a color chart by printing. For example, it may also be possible to create a color chart by pasting a color patch created by manually cutting out an already-existing color material to a plate and the like. Further, it may also be possible to handle a color chart that is displayed on a display device, such as a display.

Explanation is returned to FIG. 8. At S808, the image capturing control unit 16 captures the color chart by using the image capturing apparatus 5. Then, the image capturing control unit 16 acquires color signal values ($R_c$, $G_c$, $B_c$) corresponding to each of the plurality of color patches in the captured image. For example, by averaging the color signal values in the region of each color patch in the captured image, the color signal values ($R_c$, $G_c$, $B_c$) as captured image data, each piece of which being for each of the plurality of color patches, are acquired. The color signal values ($R_c$, $G_c$, $B_c$) are device-dependent color signal values.

At S809, the measurement control unit 17 measures the color chart using the measuring device 8. By this step, color signal values (X, Y, Z) as measured data each piece of which being for each of the plurality of color patches are acquired. The color signal values (X, Y, Z) are device-independent color signal values.

At S810, the color conversion parameter creation unit 18 creates color conversion parameters representing a correspondence relationship between the device-dependent color signal values ($R_c$, $G_c$, $B_c$) and the device-independent color signal values (X, Y, Z). Each of the color signal values (RGB values, specifically, ($R_c$, $G_c$, $B_c$)) acquired at S808 is converted into L*a*b* values (referred to as ($L^*_1$, $a^*_1$, $b^*_1$)) by using formula (3) to formula (7). Here, the color signal values of the reference white color are taken to be ($X_w$, $Y_w$, $Z_w$). The L*a*b* values are device-independent color signal values and are values represented in a color space whose axes are taken to be L*, a*, and b*, respectively. Further, each of the device-independent color signal values (X, Y, Z) acquired at S809 is converted into L*a*b* values (referred to as ($L^*_2$, $a^*_2$, $b^*_2$)) by using formula (4) to formula (7).

[Mathematical formula 3]

$$\begin{pmatrix} X \\ Y \\ Z \end{pmatrix} = \begin{pmatrix} \alpha 0 & \alpha 1 & \alpha 2 \\ \alpha 3 & \alpha 4 & \alpha 5 \\ \alpha 6 & \alpha 7 & \alpha 8 \end{pmatrix} \begin{pmatrix} R \\ G \\ B \end{pmatrix} \quad \text{formula (3)}$$

[Mathematical formula 4]

when $X/Xw > 0.00856$     formula (4)

$XRate = (X/Xw)^{1/3}$ when $X/Xw \leq 0.00856$ $XRate = 7.787 \times (X/Xw) + 16.0/116.0$

[Mathematical formula 5]

when $Y/Yw > 0.00856$     formula (5)

$YRate = (Y/Yw)^{1/3}$ when $Y/Yw \leq 0.00856$ $YRate = 7.787 \times (Y/Yw) + 16.0/116.0$

[Mathematical formula 6]

when $Z/Zw > 0.00856$     formula (6)

$ZRate = (Z/Zw)^{1/3}$ when $Z/Zw \leq 0.00856$ $ZRate = 7.787 \times (Z/Zw) + 16.0/116.0$

[Mathematical formula 7]

$$\left. \begin{array}{l} L^* = 116 \times YRate - 16.0 \\ a^* = 500 \times (XRate - YRate) \\ b^* = 200 \times (YRate - ZRate) \end{array} \right\} \quad \text{formula (7)}$$

Coefficients $\alpha 0$ to $\alpha 8$ of the matrix expressed in formula (3) are found by the least squares method so that a color difference $\Delta E$ expressed in formula (8) becomes near to 0. By finding the coefficients $\alpha 0$ to $\alpha 8$ of the matrix, formula (3) is obtained, which is a relation formula representing the correspondence relationship between the device-dependent color signal values ($R_c$, $G_c$, $B_c$) and the device-independent color signal values (X, Y, Z).

[Mathematical formula 8]

$\Delta E = (L^*_2 - L^*_1)^2 + (a^*_2 - a^*_1)^2 + (b^*_2 - b^*_1)^2$     formula (8)

The coefficients of the matrix in formula (3) are output as the color conversion parameters. Each of the RGB values of the captured image of the inspection-target object and each of the reference RGB values are converted into L*a*b* values by using formula (3) to formula (7). After that, the color difference is calculated by a color difference calculation formula, such as $\Delta E76$ and $\Delta E94$. By using this color difference as the evaluation value, it is possible to perform color inspection.

It may also be possible to create a lookup table (in the following, "LUT") in place of finding the color conversion parameters. In the LUT creation, first, on the display device 3, a color chart including a total of 729 color patches is displayed, which are obtained by changing each of R, G, and B of displayed color signal values ($R_D$, $G_D$, $B_D$) at intervals of 32 from (0, 0, 0) to (255, 255, 255). Next, by measuring each displayed color patch with the measuring device 8, the device-independent color signal values (X, Y, Z) are acquired. Due to this, for each color patch, a correspondence table between the displayed color signal values ($R_D$, $G_D$, $B_D$) and the device-independent color signal values (X, Y, Z) is obtained. By converting this correspondence table into an LUT format, an $LUT_D$ is created.

Further, as the LUT for color conversion (referred to as color conversion LUT), it may also be possible to create an LUT for converting RGB values into RGB values, in addition to the LUT for converting RGB values into XYZ values. For example, by gamut mapping, a color conversion $LUT_A$ is created, which stores a correspondence relationship between captured color signal values ($R_C$, $G_C$, $B_C$) and the displayed color signal values ($R_D$, $G_D$, $B_D$). First, a color conversion $LUT_C$ is created, which stores a correspondence relationship between the captured color signal values ($R_C$, $G_C$, $B_C$) and the device-independent color signal values (X, Y, Z). It is possible to create the color conversion $LUT_C$ by acquiring 729 correspondence relationships by changing the captured color signal values ($R_C$, $G_C$, $B_C$) at intervals of 32 from (0, 0, 0) to (255, 255, 255). Next, by using the color conversion $LUT_C$ and the color conversion $LUT_D$, which are created, the captured color signal values ($R_C$, $G_C$, $B_C$) are converted into the displayed color signal values ($R_D$, $G_D$, $B_D$) by the publicly known gamut mapping. By this conversion, the correspondence relationship between the captured color signal values ($R_C$, $G_C$, $B_C$) and the displayed color signal values ($R_D$, $G_D$, $B_D$) is obtained, and therefore, the color conversion $LUT_A$ can be created. It may also be possible to use this $LUT_A$ in place of the color conversion parameters.

In the present embodiment, as an example of the color chart, the color chart 6 consisting of 12 (three in the vertical direction×four in the horizontal direction) color patches is shown, but the number of color patches constituting a color chart is not limited to 12 and may be any integer. Further, as positional information on each color patch, the coordinate information on the center point of the color patch is used, but it may also be possible to use coordinate information on a position other than the center. For example, it may also be possible to use coordinate information on an end, such as the upper-right end of a color patch.

Further, as shown in FIG. 5, it is assumed that the image capturing apparatus 5 and the chart 6 squarely face each other, but they do not have to squarely face each other. Further, the data relating to the reflected light intensity, which is created at S803, does not necessarily have to be in the ranking format. For example, it may also be possible to divide the position within the chart 6 into the position at which the reflected light intensity is high and the position at which the reflected light intensity is low by threshold value processing using a predetermined threshold value, and lay out color patches having angle dependence at the position at which the reflected light intensity is low.

Further, in the present embodiment, as shown in FIG. 1, FIG. 4, FIG. 5 and the like, the color conversion parameter creation system has the one illumination 7, but the color conversion parameter creation system may have a plurality of (two or more) illuminations. In that case, the reflected light intensity is the sum of the illumination component of each illumination.

<Effects of the Present Embodiment>

As described previously, according to the present embodiment, the layout position of the color patch is determined based on the reflected light intensity in accordance with the position. Then, by laying out the color patch having angle dependence at the position at which the reflected light intensity is low, it is possible to lessen the influence of specular reflection and create highly accurate color conversion parameters.

Second Embodiment

In the first embodiment, only one color patch having angle dependence is laid out within the color chart for one kind. In contrast to this, in the present embodiment, one or more color patches having angle dependence are laid out for one kind. The hardware configuration of the information processing apparatus 1 and the information processing apparatus 2 in the present embodiment is the same as that in the first embodiment, and therefore, explanation is omitted. In the following, portions different between the present embodiment and the first embodiment are explained mainly. Further, explanation is given by attaching the same symbol to the same configuration as that of the first embodiment.

<Function Configuration of Information Processing Apparatus, GUI>

Figure 11:
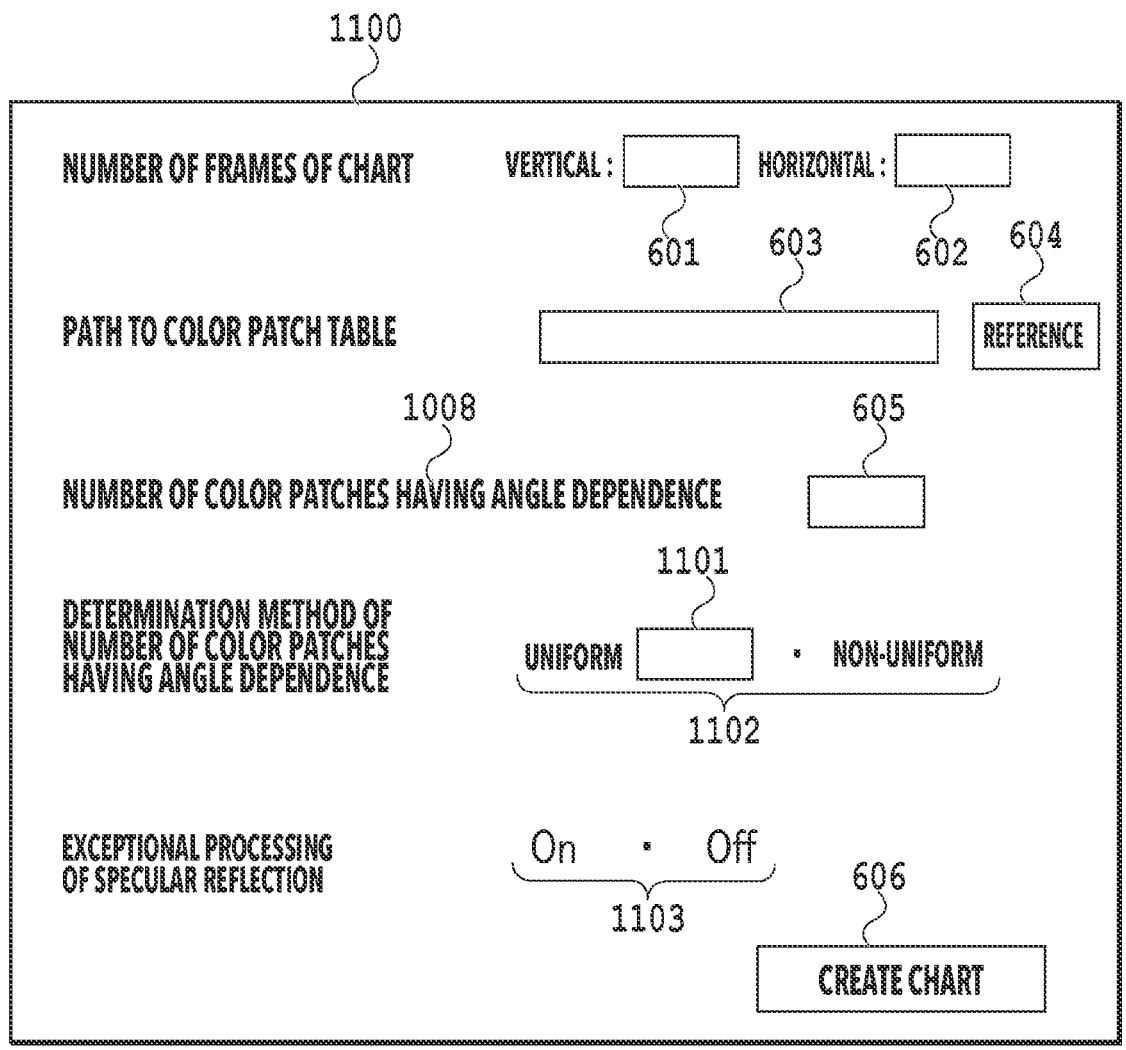
FIG. 11 is a diagram showing a GUI.

The display control unit 12 displays a GUI on, for example, the display device 3 and receives user instructions that are input via the input device 110. In the present embodiment, as an example, a GUI 1110 shown in FIG. 11 is used. As shown in FIG. 11, the GUI 1100 has text boxes indicated by the symbols 601, 602, 603, 605, and symbol 1101, buttons indicated by the symbols 604 and 606, and selection lists indicated by symbols 1102 and 1103.

A user inputs the path to a file in the color patch table describing information on color patches to the text box 603. This file in the color patch table is stored in advance in the HDD 112 and the like. The color patch table is, for example a table as shown in FIG. 12. In the fifth column of this table, the number of layouts indicating how many corresponding color patches are laid out is described. This number of layouts may be described in advance. In a case where the number of layouts is not described in the fifth column, it is determined by processing, to be described later, during the processing.

<Processing Performed by Information Processing Apparatus>

Figure 13:
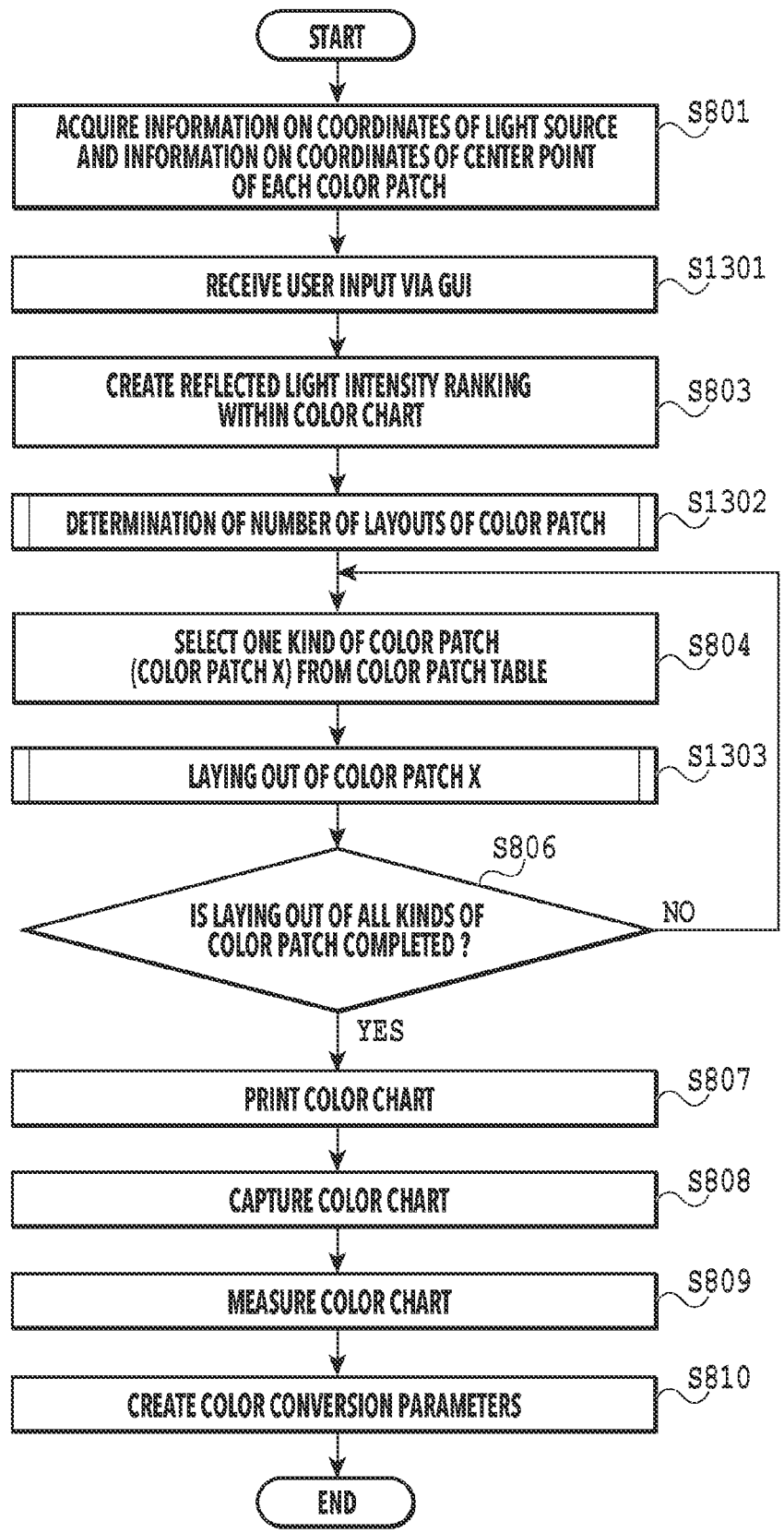
FIG. 13 is a flowchart showing processing of the information processing apparatus.
Figure 14:
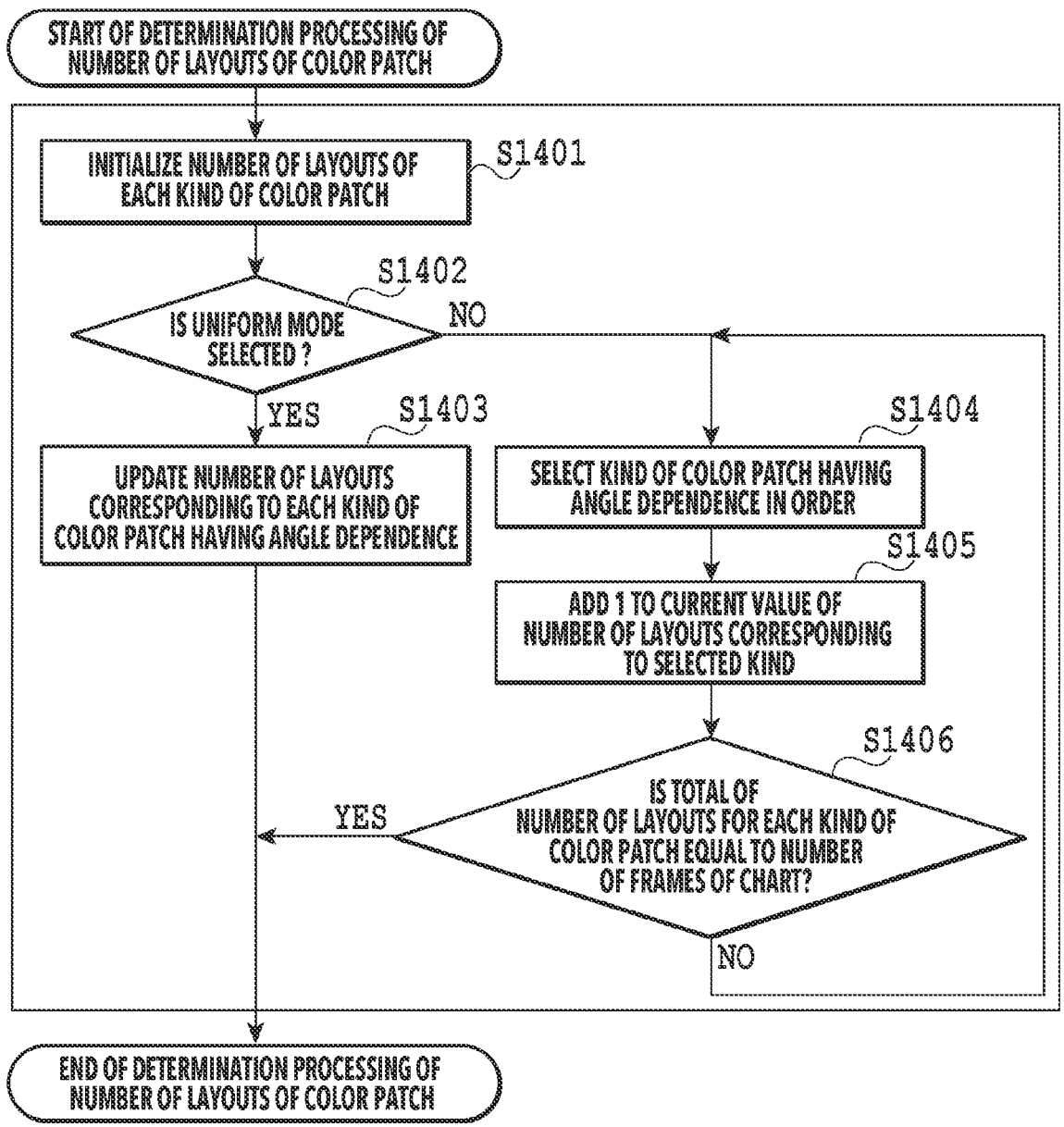
FIG. 14 is a flowchart showing determination processing of the number of layouts of the color patch.
Figure 15:
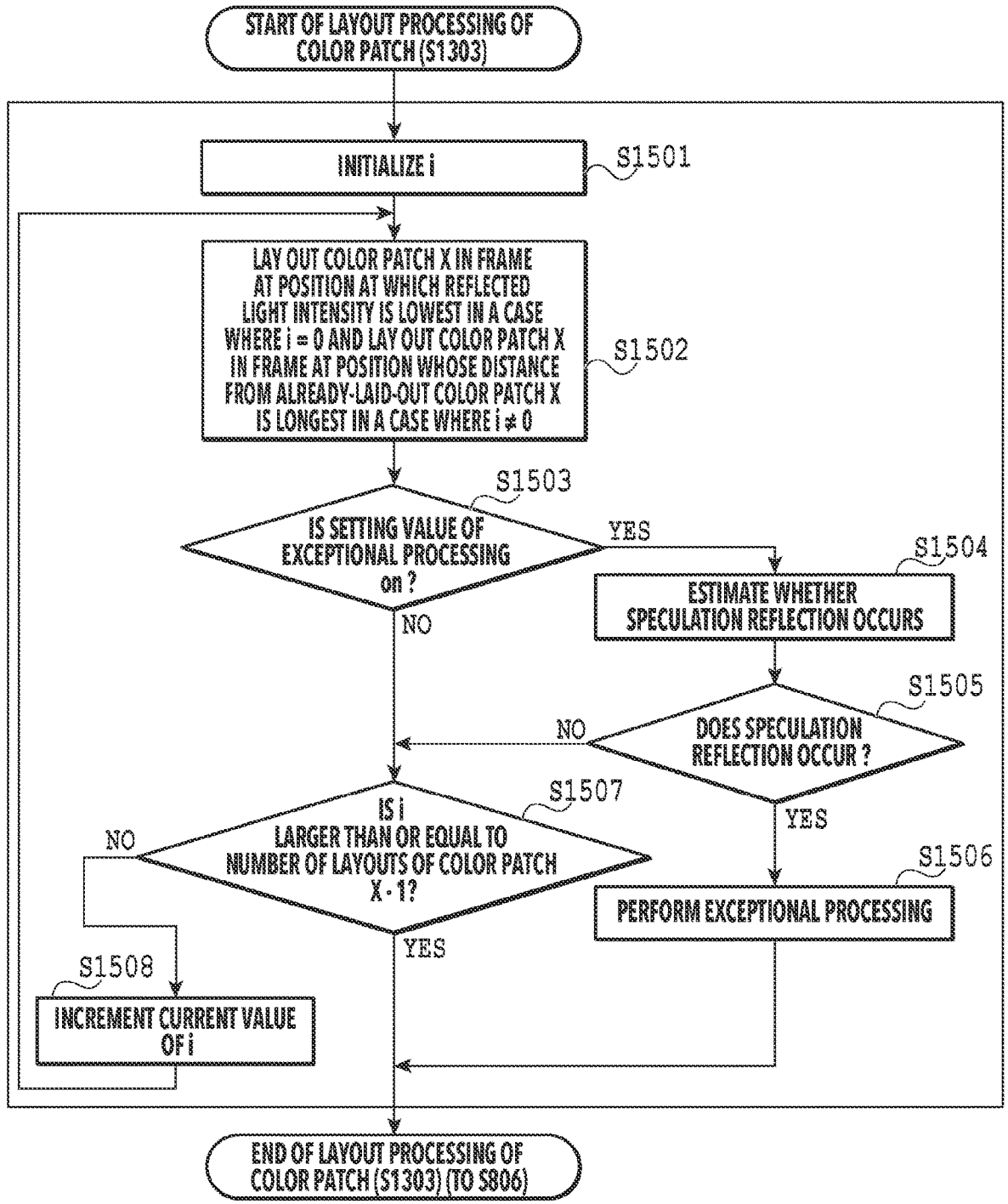
FIG. 15 is a flowchart showing layout processing of a color patch X.

FIG. 13 to FIG. 15 are each a flowchart showing processing performed by the information processing apparatus 1 and the information processing apparatus 2.

At S1301, the display control unit 12 receives a user input relating to the setting of a color chart. Here, the state transition in a case where the display control unit 12 uses the GUI shown in FIG. 11 is explained with reference to FIG. 16.

Figure 16:
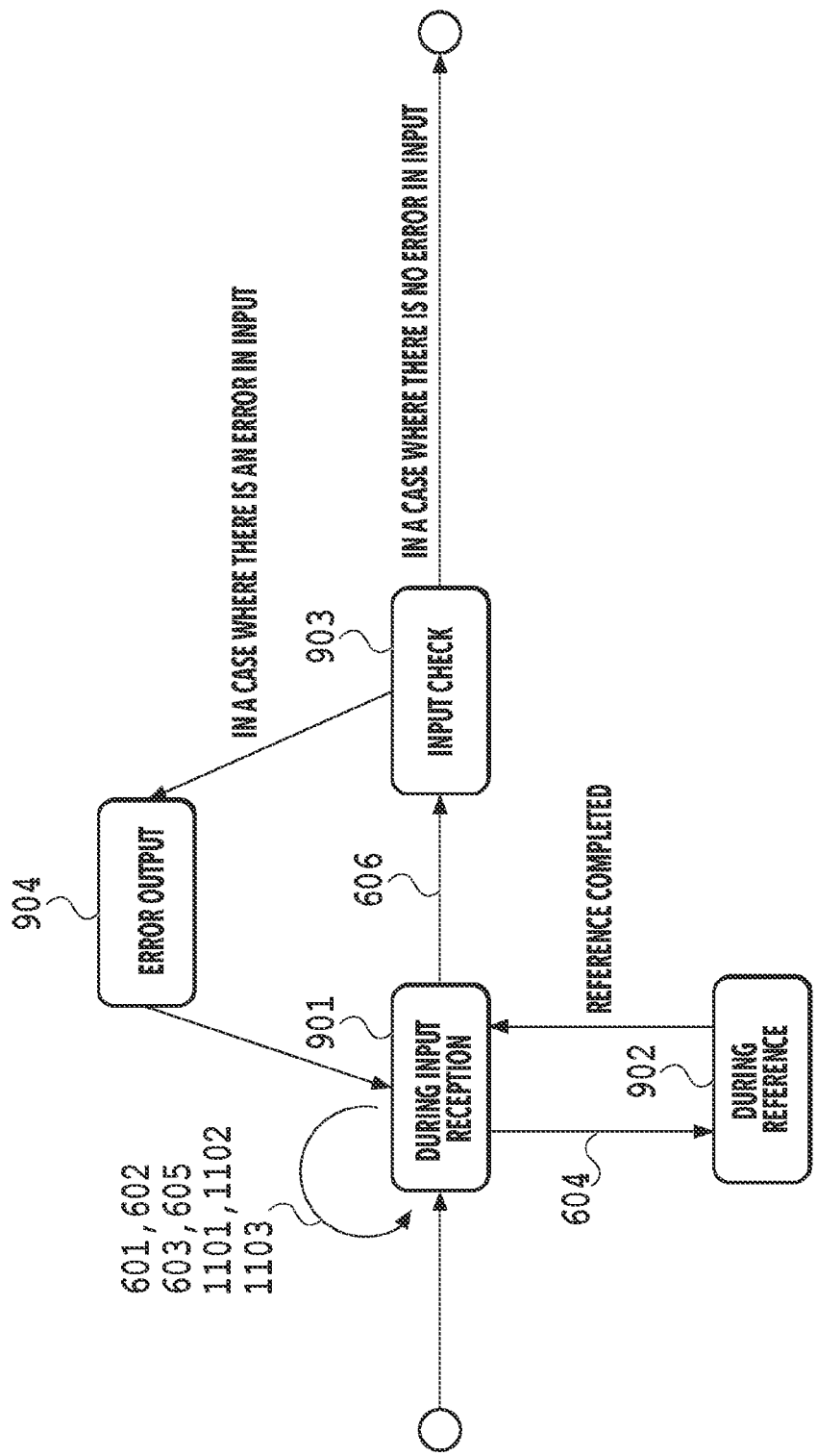
FIG. 16 is a state transition diagram in a case where the GUI in FIG. 11 is used.

Each of the symbols 901 to 904 in FIG. 16 indicates one state and each of the symbols 601 to 606, 1101 to 1103 indicates an input by the operation element shown in FIG. 11. In "During input reception" 901, an input by a use is received. In a case where the display control unit 12 receives an input via the text box or the selection list, the transition is self-transition from "During input reception" 901 to "During input reception" 901 as shown in FIG. 16.

A user selects whether to make uniform or non-uniform the number of color patches having angle dependence via the selection list 1102. Here, in a case where uniformity is selected, for example, the numbers of color patches having angle dependence for each kind of color patch are all set to two or the like, and in this manner, the number of color patches for each kind of color patch is made the same. The user inputs the number made uniform to the text box 1101. Further, the user selects whether or not to perform exceptional processing of specular reflection via the selection list 1103. Here, the exceptional processing of specular reflection is specific processing that is performed in a case where it is estimated that specular reflection will occur at the position at which the color patch is laid out.

At S1302, the determination unit 14 determines the number of layouts of the color patch. S1302 is explained in detail by using FIG. 14.

First, at S1401, the determination unit 14 initializes the number of layouts of the color patch, that is, sets the number of layouts to 1 for each kind of color patch.

Next, at S1402, the determination unit 14 determines whether "Uniform" is selected via the selection list 1102 at S1301. In a case where the determination results at this step are affirmative, the processing advances to S1403. On the other hand, in a case where the determination results at this step are negative (that is, "Non-uniform" is selected by a user via the selection list 1102), the processing advances to S1404.

At S1403, the determination unit 14 updates the number of layouts of the color patch corresponding to each kind of color patch having angle dependence. For example, the determination unit 14 sets the number of layouts of the color patch to the value that is input to the text box 1101 for each kind of color patch having angle dependence.

At S1404, the determination unit 14 selects one kind of color patch having angle dependence from the color patch table. As will be described later, the selection processing at this step is performed repeatedly and at the time of the repetitive selection of one kind of color patch, the selection is performed in order from the color patch whose angle in the vicinity of specular reflection is the largest.

At S1405, the determination unit 14 adds 1 to the current value of the number of layouts corresponding to the kind of color patch selected at immediately previous S404.

At S1406, the determination unit 14 determines whether the total of the number of layouts determined so far for each kind of color patch coincides with the number of frames of the color chart. In a case where the determination results at this step are affirmative, the series of processing is terminated. On the other hand, in a case where the determination results at this step are negative, the processing returns to S1404.

The number of layouts for each kind of color patch, which is determined by the processing in FIG. 14, is stored by, for example, updating the fifth column in the color patch table (see FIG. 12) stored in the HDD 112, and read and used as needed in the subsequent processing.

Explanation is returned to FIG. 13. After the determination processing of the number of layouts of the color patch, at S804, the determination unit 14 selects one kind of color patch from the color patch table. The color patch of the kind selected at this step is taken to be the color patch X.

At S1303, the determination unit 14 lays out the color patch X. S1303 is explained in detail using FIG. 15.

First, at S1501, the determination unit 14 initializes a variable (referred to as loop variable i) indicating the number of times of loop, that is, sets the loop variable i to 0.

At S1502, the determination unit 14 lays out the color patch X within the color chart. To explain specifically, in a case where the loop variable i is 0, the determination unit 14 lays out the color patch X in the frame at the position at which the reflected light intensity is the lowest. On the other hand, in a case where the loop variable is not 0, the determination unit 14 lays out the color patch X in the frame at the position whose distance from the already-laid-out color patch X is the longest (position the most distant from the already-laid-out color patch X). It may also be possible to first classify the frames of the color chart into frames whose reflected light intensity is high and frames whose reflected light intensity is low by the threshold value processing and then lay out the color patch X in the frame whose distance from the already-laid-out color patch X is the longest among the frames whose reflected light intensity has been determined to be low. Further, here, the aspect in which the two color patches of the same kind are laid out is described, but it may also be possible to lay out three or more color patches of the same kind. In this case, an aspect is considered in which at the time of laying out the nth color patch, the distances from the positions of the first to the (n−1)th already-laid-out color patches are calculated and the nth color patch is laid out in the frame at the position whose distance is the minimum among all the distances.

At S1503, the determination unit 14 determines whether the setting value relating to the exceptional processing of specular reflection is On, that is, whether "On" is selected by a user via the selection list 1103. In a case where the determination results at this step are affirmative, the processing advances to S1504. On the other hand, in a case where the determination results at this step are negative (that is, in a case where "Off" is selected by a user via the selection list 1103), the processing advances to S1507.

At S1504, the determination unit 14 estimates whether specular reflection occurs. For example, from $\cos \theta i$ that is calculated by formula (2), $\theta$ is found. In a case where $\theta$ is in the range of the angle in the vicinity of specular reflection of the color patch X described in the color patch table, it is estimated that specular reflection will occur.

At S1505, the determination unit 14 determines whether specular reflection occurs based on the estimation results at S1504. In a case where the determination results at this step are affirmative, the processing advances to S1506. On the other hand, in a case where the determination results at this step are negative (that is in a case where it is estimated that specular reflection will not occur), the processing advances to S1507.

At S1506, the determination unit 14 performs the exceptional processing for increasing the number of layouts of the color patch X. For example, it may also be possible for the determination unit 14 to notify a user that specular reflection will occur and prompt a user to increase the number of layouts of the color patch or change the geometrical condition. Further, it may also be possible for the determination unit 14 to display a warning to the effect that specular reflection will occur on the display device 3.

At S1507, the determination unit 14 determines whether the value of the loop variable i is larger than or equal to a value obtained by subtracting 1 from the number of layouts corresponding to the color patch X. In a case where the determination results at this step are affirmative, the series of processing is terminated. On the other hand, in a case where the determination results at this step are negative, the processing advances to S1508.

At S1508, the determination unit 14 increments (adds 1 to) the current value of the loop variable i. After this step, the processing advances to S1502.

<Effects of the Present Embodiment>

As described previously, according to the present embodiment, the number of layouts of the color patch for each kind is determined and the color patches are laid out by taking into consideration the reflected light intensity that is different at different positions within the color chart. Due to this, a plurality of color patches having angle dependence is laid out at the position at which the reflected light intensity is low, and as a result, it is possible to lessen the influence of specular reflection and create highly accurate color conversion parameters.

Third Embodiment

In the first embodiment and the second embodiment, the layout of the color patches is found based on the reflected light intensity at the position within the color chart. In contrast to this, in the present embodiment, the number of layouts of the color patch is determined based on the illumination condition. The hardware configuration of the information processing apparatus 1 and the information processing 2 in the present embodiment is the same as that of the first embodiment, and therefore, explanation thereof is omitted. In the following, portions different between the present embodiment and the first embodiment are explained mainly. Further, explanation is given by attaching the same symbol to the same configuration as that of the first embodiment.

<Processing Performed by Information Processing Apparatus>

Figure 17:
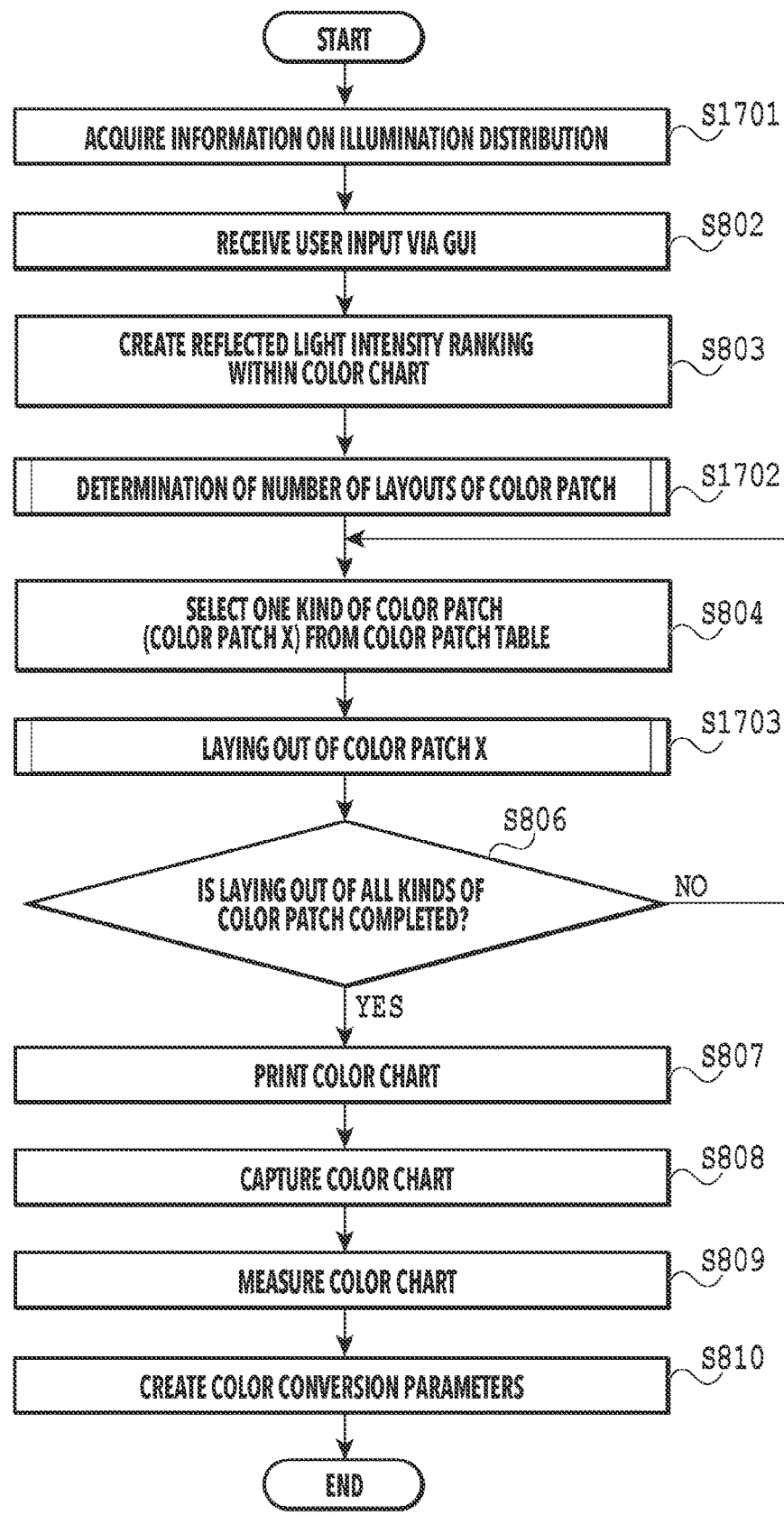
FIG. 17 is a flowchart showing processing of the information processing apparatus.

FIG. 17 is a flowchart showing processing performed by the information processing apparatus 1 and the information processing apparatus 2.

At S1701, the acquisition unit 11 acquires information on the illumination distribution as the illumination condition. Based on the information on the illumination distribution acquired at this step, the number of layouts of the color patch is determined. Here, it is assumed that, for example, a plurality of the illuminations 7 exists and the number of the illuminations 7 is acquired.

At S1702, the number of layouts of the color patch is determined. Specifically, the number of layouts corresponding to each kind of color patch having angle dependence is made the same as the number of the illuminations 7 acquired at S1701. It is not necessarily required to make the number of layouts corresponding to the kind of color patch having angle dependence the same as the number of the illuminations 7 and it may also be possible to increase the number of layouts of the color patch having angle dependence as the number of illuminations increases.

At S1703, the determination unit 14 lays out the color patch X. The layout processing at this step is the same as that at S1303, and therefore, explanation thereof is omitted here.

In the present embodiment, the number of layouts of the color patch having angle dependence is determined based on the number of the illuminations 7, but for example, it may also be possible to determine the number of layouts in accordance with the area of the direct light of the illumination at the position of the color chart.

For example, a mirror whose size is the same as that of the color chart is placed at the position at which the color chart is set and the placed mirror is captured by the image capturing apparatus 5 and the area of the region in which total reflection occurs (or area of the region in which reflected light intensity is higher than or equal to a predetermined threshold value) is checked. The ratio of the area to the area of the entire mirror is taken to be P. At this time, specular reflection occurs in the ratio P of the color patches that are laid out. In order to lessen the influence, it may also be possible to determine the number of layouts of the patch in accordance with a formula below so that the color patches having angle dependence occupy the region whose area is larger than the ratio P.

[Mathematical formula 9]

number of layouts of color patch having angle dependence in color chart=number of color patches that can be laid out in color chart×P×2     formula (9)

In this specification, laying out color patches so that formula (9) holds is described as "laying out two color patches in the ratio P". At this time, it may also be possible to make determination so that two color patches are laid out in order from the color patch whose angle in the vicinity of specular reflection is the largest.

Further, it may also be possible set the image capturing apparatus at the position of the color chart and determine the number of layouts of the color patch based on the captured image by the set image capturing apparatus. For example, it may also be possible to find the ratio P of the pixels that capture illumination in the captured image in accordance with formula (10) and lay out two color patches in the found ratio P.

[Mathematical formula 10]

P=number of pixels that captures illumination in captured image/number of pixels in entire captured image     formula (10)

Further, it may also be possible to determine the number of layouts of the color patch based on the area occupied by the illumination, which is viewed from the position of the color chart. A region on a unit sphere with the color chart being taken as a center is considered. Specifically, a first region in which there is an illumination on the extension line of a line connecting the center of the color chart and a point on the unit sphere and a second region in which there is no illumination are considered and the number of layouts of the color patch is determined based on the ratio of the first region. Here, the light behind the color chart is not taken into consideration, and therefore, only the unit hemisphere on the side in the direction of the front of the color chart is considered. In a case where the ratio of the first region in this unit hemisphere is P, the number of layouts of the color patch is determined so that two color patches are laid out in the ratio P.

Further, it is not necessarily required to measure the illumination distribution and it may also be possible for a user to manually input the ratio P. For example, it may also be possible to provide a GUI with which the ratio P is input between 0 and 1 and lay out two color patches in the ratio P input by a user. Further, it is not necessarily required to use the ratio and it may also be possible to use an input indicating whether the number of illuminations is small or a large, or an input indicating the area occupied by the illumination.

Further, in a case where the ratio P described previously is obtained, it is not necessarily required to lay out two color patches in the ratio P and it may also be possible to reduce the number of color patches that are laid out in twos so that the color patches are included in the range of the set number of frames. Furthermore, it may also be possible to lay out two color patches in a ratio higher than the ratio P described previously. Still furthermore, it may also be possible to lay out three or more color patches of the same kind (that is, the same color).

In a case where the number of frames of the color patch runs short in the set color chart at the time of changing the number of layouts, it may also be possible to automatically change the number of frames so that the number of frames on the color chart is sufficient.

<Effects of the Present Embodiment>

As described previously, according to the present embodiment, the number of layouts of the color patch having angle dependence and the layout position are determined based on the illumination condition. By laying out a plurality of color patches having angle dependence, it is possible to lessen the influence of specular reflection and create highly accurate color conversion parameters.

Other Embodiments

It may also be possible to perform the processing by using a trained model for which machine learning has been performed in place of the estimation unit 13, the determination unit 14 and the like of each processing unit described above. In that case, for example, a plurality of combinations of input data to the processing unit and output data is prepared as learning data and knowledge is acquired therefrom by machine learning and a trained model is generated, which outputs output data for input data as results based on the acquired knowledge. It is possible to configure a trained model by, for example, a neural network model. Then, the trained model performs the processing of the processing unit described previously by operating in cooperation with the CPU or the GPU or the like as a program for performing processing equivalent to that of the processing unit described previously. It may also be possible to update the above-described trained model as needed after predetermined processing.

Further, it may also be possible to appropriately combine the embodiments described previously.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present invention, in a case where a color patch having angle dependence is used, it is made possible to create color conversion parameters for performing highly accurate conversion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-162344, filed Sep. 28, 2020 and No. 2021-070471, filed Apr. 19, 2021, which are hereby incorporated by reference wherein in theirs entirety.

What is claimed is:

1. An information processing apparatus comprising:
one or more processors; and
a memory, including instructions thereon, which when executed by the processor cause the information processing apparatus to:
acquire information relating to a geometrical condition in a case where a color chart irradiated with light is captured; and
determine a position at which each of a plurality of color patches is laid out in the color chart based on the geometrical condition,
wherein in the plurality of color patches laid out in the color chart, a color patch having angle dependence and a color patch not having angle dependence are included, and
wherein the color patch having angle dependence is a color patch whose ratio of intensity in a specular reflection direction to intensity in a diffuse reflection direction is higher than that of the color patch not having angle dependence.

2. The information processing apparatus according to claim 1, wherein
in the geometrical condition, a positional relationship between an image capturing apparatus, a light source, and the color chart is included.

3. The information processing apparatus according to claim 1, wherein
in the plurality of color patches laid out in the color chart, a metallic color patch is included.

4. The information processing apparatus according to claim 1, wherein
reflected light intensity by direct light of a light source differs depending on a position within the color chart.

5. The information processing apparatus according to claim 1, wherein
the color chart has a plurality of frames in each of which one color patch is laid out.

6. The information processing apparatus according to claim 5, wherein the instructions, when executed by the one or more processors, further cause the information processing apparatus to:
calculate, for each frame of the plurality of frames, intensity of light of a light source, which enters a position of a center point of each of the frames and which is reflected toward a direction of an image capturing apparatus, by using coordinate information on the center point, which is acquired as information relating to the geometrical condition, and intensity of direct light of a light source.

7. The information processing apparatus according to claim 6, wherein the instructions, when executed by the one or more processors, further cause the information processing apparatus to:

create a reflected light intensity ranking indicating a ranking of reflected light intensity corresponding to each of the plurality of frames of the color chart based on intensity calculated.

8. The information processing apparatus according to claim 7, wherein the instructions, when executed by the one or more processors, further cause the information processing apparatus to:
select one kind of color patch from the plurality of color patches; and
determine a layout position of the selected one kind of color patch by using the reflected light intensity ranking.

9. The information processing apparatus according to claim 8, wherein the instructions, when executed by the one or more processors, further cause the information processing apparatus to:
select the one kind of color patch in order from one whose angle in the vicinity of specular reflection is the widest; and
allocate, as a frame in which the selected one kind of color patch is laid out, a frame in order from one whose reflected light intensity in the reflected light intensity ranking is the lowest.

10. The information processing apparatus according to claim 9, wherein
in the color chart, a color patch having angle dependence is laid out in a frame whose reflected light intensity is relatively low and a color patch not having angle dependence is laid out in a frame whose reflected light intensity is relatively high.

11. The information processing apparatus according to claim 1, wherein
in the plurality of color patches, two or more color patches of the same color are included and
the determination unit determines layout positions of the two or more color patches of the same color.

12. The information processing apparatus according to claim 11, wherein
in a case where the number of the two or more color patches of the same color is two, the determination unit determines layout positions of the color patches of the same color so that a distance between the color patches of the same color becomes large.

13. The information processing apparatus according to claim 11, wherein
the number of layouts of the two or more color patches of the same color in the color chart is determined based on a ratio of an area of a region in which reflected light intensity in a region in the color chart is higher than or equal to a predetermined threshold value.

14. The information processing apparatus according to claim 11, wherein
the number of layouts of the two or more color patches of the same color in the color chart is determined based on a captured image by an image capturing apparatus that is set at a position of the color chart.

15. The information processing apparatus according to claim 1, wherein
in the geometrical condition, an illumination distribution of a light source is included.

16. The information processing apparatus according to claim 15, further comprising:
a determination unit configured to determine the number of layouts corresponding to each kind of color patch included in the plurality of color patches using information on the illumination distribution.

17. The information processing apparatus according to claim 1, further comprising:
a display control unit configured to cause a display unit to display a graphical user interface, wherein
the graphical user interface has:
a first text box for inputting the number of frames of the color chart;
a second text box for inputting a path to a color patch table; and
a third text box for inputting the number of color patches having angle dependence.

18. An information processing method comprising:
a step of acquiring information relating to a geometrical condition in a case where a color chart irradiated with light is captured; and
a step of determining a position at which each of a plurality of color patches is laid out in the color chart based on the geometrical condition,
wherein in the plurality of color patches laid out in the color chart, a color patch having angle dependence and a color patch not having angle dependence are included; and
wherein the color patch having angle dependence is a color patch whose ratio of intensity in a specular reflection direction to intensity in a diffuse reflection direction is higher than that of the color patch not having angle dependence.

19. A non-transitory computer readable storage medium storing a program for causing a computer to perform an information processing method comprising:
a step of acquiring information relating to a geometrical condition in a case where a color chart irradiated with light is captured; and
a step of determining a position at which each of a plurality of color patches is laid out in the color chart based on the geometrical condition,
wherein in the plurality of color patches laid out in the color chart, a color patch having angle dependence and a color patch not having angle dependence are included; and
wherein the color patch having angle dependence is a color patch whose ratio of intensity in a specular reflection direction to intensity in a diffuse reflection direction is higher than that of the color patch not having angle dependence.

* * * * *